United States Patent [19]

Hachiro

[11] 4,295,412
[45] Oct. 20, 1981

[54] HOSE WITH A ONE-WAY VALVE FOR A VACUUM OPERATED SERVOMOTOR

[75] Inventor: Nobuaki Hachiro, Ueda, Japan

[73] Assignee: Nissin Kogyo Kabushiki Kaisha, Ueda, Japan

[21] Appl. No.: 103,512

[22] Filed: Dec. 12, 1979

[30] Foreign Application Priority Data

Dec. 19, 1978 [JP] Japan ................. 53-158996

[51] Int. Cl.³ ............... F15B 13/04; F16K 15/00
[52] U.S. Cl. ................... 91/468; 137/454.2; 137/543.17; 137/551
[58] Field of Search ............. 91/468; 137/454.2, 526, 137/539, 540, 543.17, 551

[56] References Cited

U.S. PATENT DOCUMENTS

| 1,207,392 | 12/1916 | Frazier et al. | 137/454.2 |
| 2,996,077 | 8/1961 | Taggert | 137/454.2 X |
| 3,086,544 | 4/1963 | Yost | 137/540 |
| 3,288,142 | 11/1966 | Hakim | 137/539 X |
| 3,387,625 | 6/1968 | Laure | 137/539 X |
| 3,725,990 | 4/1973 | Petersen et al. | 137/539 X |
| 4,195,661 | 4/1980 | Takeuchi | 91/369 B X |

FOREIGN PATENT DOCUMENTS 1282242 7/1972 United Kingdom ............... 137/540

Primary Examiner—Gerald A. Michalsky
Attorney, Agent, or Firm—Haseltine and Lake

[57] ABSTRACT

A hose with a one-way valve used in a brake actuating system for automobiles. A one-way valve unit is housed in a flexible hose for connecting a booster shell of a servomotor with an intake manifold of the internal combustion engine so as to prevent leakage of vacuum. A valve housing receives therein a valve member and a valve spring thereby forming the one-way valve unit. The housing further has a valve seat, a cylindrical guide portion and an annular seal projection of diameter larger than the guide portion. A fastening band is provided on the outer periphery of the hose to prevent movement of the one-way valve and is marked with a mounting direction of the hose.

1 Claim, 6 Drawing Figures

HOSE WITH A ONE-WAY VALVE FOR A VACUUM OPERATED SERVOMOTOR

BACKGROUND OF THE INVENTION

1. Field of the Invention

The present invention relates to a hose with a one-way valve wherein a flexible hose to provide a connection between a booster shell of a vacuum operated servomotor used in a brake actuating system or the like of an automobile and an intake manifold of an internal combustion engine as a vacuum source is provided with a one-way valve for controlling transmission of vacuum in a single direction from the vacuum source to the servomotor.

2. Description of the Prior Art

In conventional hoses with a one-way valve for vacuum operated servomotors, a flexible hose to provide a connection between a booster shell and an intake manifold is cut in the midst thereof to incorporate therein a hard valve housing accommodating a one-way valve, and consequently, for example, when the hose is bended materially, there occurs a poor connection in a connection point between the hard housing and the flexible hose, posing a disadvantage that vacuum leaks therefrom.

SUMMARY OF THE INVENTION

It is therefore an object of the present invention to provide a useful hose with a one-way valve for a vacuum-operated servomotor which encases a one-way valve unit in an integral flexible hose to provide a connection between a booster shell of a servomotor and an intake manifold of an internal combustion engine so that the one-way valve unit may be maintained in position and stably under any condition of hose bending to positively prevent leakage of vacuum.

The above and further objects and novel features of the invention will more fully appear from the following embodiments when the same is read in connection with the accompanying drawings.

DESCRIPTION OF THE PREFERRED EMBODIMENTS

Figure 1:
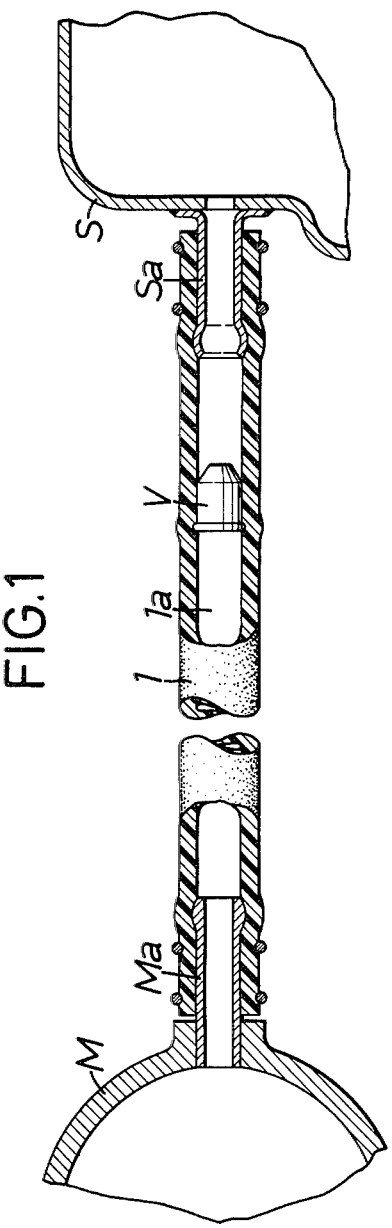
FIG. 1 is a partially longitudinal side view showing a first embodiment of a hose with a one-way valve in accordance with the present invention when it is in use.
Figure 2:
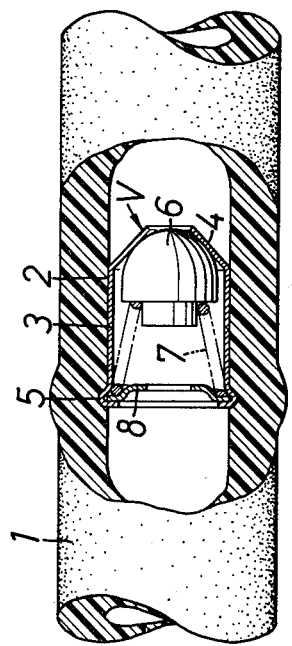
FIG. 2 is an enlarged fragmentary sectional view of essential parts in FIG. 1.

Referring first to the first embodiment of the present invention shown in FIG. 1, there is shown a booster shell S of a brake servomotor and an intake manifold M of the internal combustion engine as a vacuum source, the booster shell S having a vacuum inlet pipe Sa projected from the outer wall thereof, the intake manifold M having a vacuum outlet pipe Ma projected from the outer wall thereof. A hose 1 of the present invention is connected between the booster shell S and the intake manifold M. The hose 1 is integrally formed of a flexible material such as rubber, plastic or the like, and a one-way valve unit V is mounted in the midst of a seamless flow passage 1a. The construction of the unit V will be described with reference to FIG. 2.

A housing 2 of the one-way valve unit V is designed so that a cylindrical guide portion 3, of which outer diameter is about the same as the inner diameter of the hose 1, is provided at one end with a frusto-conical valve seat portion 4 and at the other end with an annular seal projection 5 of a larger diameter, and when the housing is affixed to the hose 1, the guide portion 3 is fitted into the internal surface of the hose whereas the seal projection 5 is urged into the internal surface of the hose 1. The housing 2 is interiorly provided with a semi-spherical valve member 6, a frusto-conical coil shaped valve spring 7 for biasing the valve member 6 in a direction of engagement with the valve seat portion 4, and a retainer 8 for retaining a fixed end of the valve spring 7 to form the one-way valve unit V, the retainer 8 being locked at the end of the cylinder 2. A means for locking the retainer 8 at the housing 2 comprises, in the illustrated embodiment, a caulked portion in which the annular seal projection 5 is inwardly folded back after the peripheral edge of the end of the housing 2 has been bended outwardly, the retainer 8 being arrested by the caulked portion. In this manner, the caulked portion for retaining the retainer 8 may perform a function of the annular seal projection 5 to simplify the construction.

In fixing the one-way valve unit V within the hose 1, the frusto-conical valve seat portion 4 is first to be inserted into an opening of the hose 1 and is then forced while placing a suitable rod against the rear end of the housing 2, as a consequence of which the guide portion 3 is fitted into the internal surface of the hose 1 and moves forward while maintaining the attitude of the housing 2 on the same axis as that of the hose 1, whereby it is possible to force the one-way valve unit V to a predetermined position in the flow passage 1a in a relatively smooth manner without inclining the unit V against the frictional resistance between the hose 1 and the seal projection 5 larger in diameter than the inner diameter of the hose. Thus, the seal projection 5 is resiliently urged into the internal surface of the hose 1 to provide an airtightness between the housing 2 and the hose 1 and position the unit V. In this case also, since the housing 2 is maintained in attitude in the same axis as that of the hose 1, various parts of the annular seal projection 5 are urged into the internal surface of the hose 1 at given angles, producing no irregularity in airtightness.

Next, the operation will be described.

Vacuum is generated within the intake manifold M as the internal combustion engine operates, and as a result, the vacuum outlet pipe Ma in the flow passage 1a is reduced in pressure than that of the vacuum inlet pipe Sa to provide a pressure difference therebetween. When such a pressure difference exceeds a preselected value, the valve member 6 is moved apart from the internal surface of the valve seat portion 4 against the set load of the valve spring 7 to allow conduction of the flow passage 1a so that vacuum within the intake manifold M is transmitted into the booster shell S via the flow passage 1a, and in other words, movement of air from the booster shell S to the intake manifold M occurs. In this case, the set load of the valve spring 7 remains unvaried since the retainer 8 for retaining the fixed end of the spring is locked at the housing without being vibrated or tilted, whereby pressure for opening the valve member 6 may be normally maintained constant.

Next, when the aforementioned pressure difference reduces to a level below the preselected value, the valve member 6 is seated on the internal surface of the valve seat portion 4 by the spring force of the valve spring 7 to cut off the flow passage 1a. Thereafter, when vacuum within the intake manifold M reduces, the function for closing the valve member 6 is further strengthened, and therefore, it is possible to prevent the vacuum within the booster shell S from being escaped into the intake manifold M, that is, to prevent a back flow of air from the interior of the intake manifold M to the booster shell S. During that time, the one-way valve unit V is not moved from its given position by the tension of the hose 1 resulting from the urge of the annular seal projection 5 into the internal surface of the hose 1 despite presence of the pressure difference, and a short-circuit flow at the outside of the housing 2 is prevented by the sealing action of the annular seal projection 5.

Thus, every time high vacuum is generated within the intake manifold M, the vacuum is stored within the booster shell S as a power for the brake servomotor.

Figure 3:
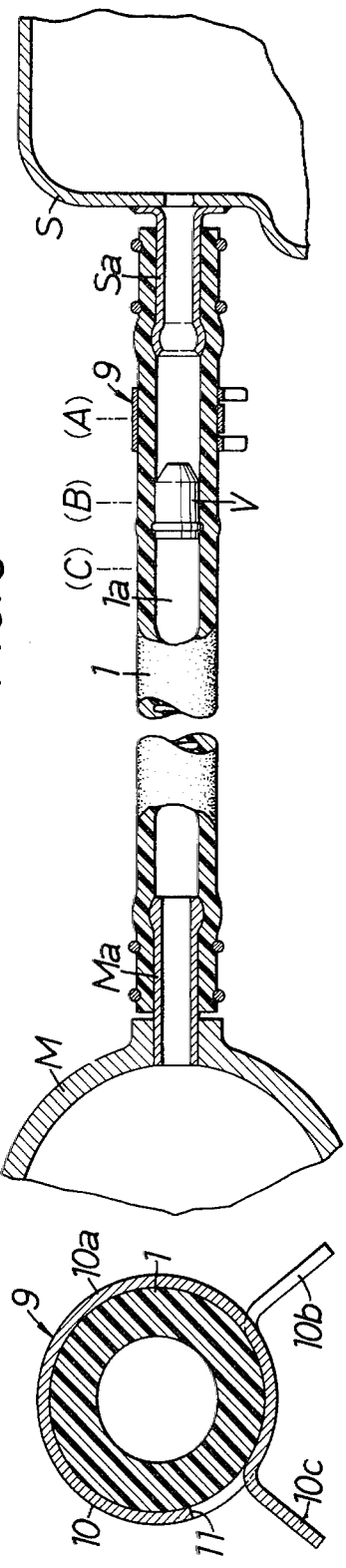
FIG. 3 is a partially longitudinal side view showing a second embodiment of the hose in accordance with the present invention when it is in use.

The second embodiment of the present invention will be described hereinafter with reference to FIG. 3. This embodiment is substantially similar in construction to the previously described embodiment except that a fastening band 9 is provided in the outer periphery of the hose 1 in order to more positively prevent axial movement of the one-way valve unit V within the integral flexible hose 1 because of the pressure difference. Those elements which are the same as their counterparts in the previous embodiment bear the same reference numerals.

Figure 5:
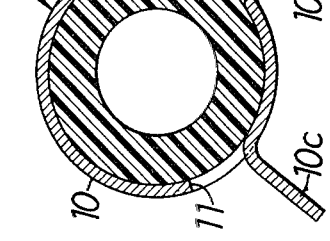
FIG. 5 is a sectional view taken along line V—V of FIG. 4.
Figure 4:
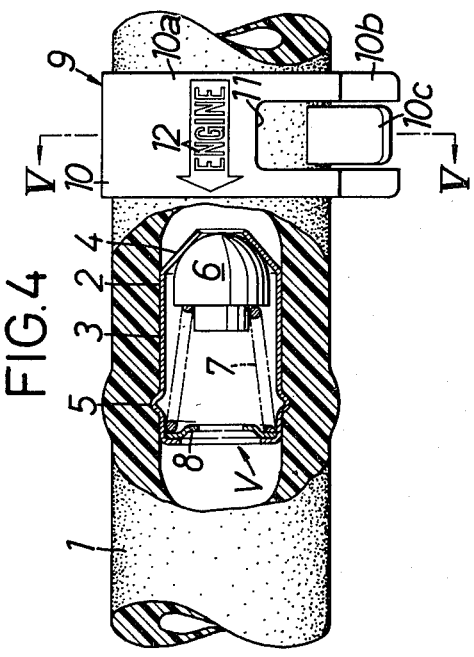
FIG. 4 is an enlarged fragmentary sectional view of the essential parts in FIG. 3.
Figure 6:
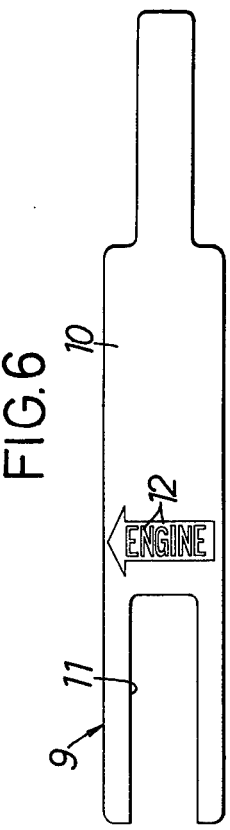
FIG. 6 is a developed view of a fastening band in the second embodiment.

The fastening band 9 is designed so that as shown in FIGS. 4–6, a band plate 10 formed of a spring steel is wound to form a circular portion 10a, both ends of which are crossed, that is, the band plate 10 has one end formed with a cut 11 into which the other end thereof of a small width is inserted, the circular portion 10a of the band plate 10 being applied with a contractive resiliency. The band plate 10 has opposite ends stood upright to form operating lugs 10b and 10c. In mounting the fastening band 9, both the lugs 10b and 10c are held so as to be close to each other to spread the circular portion 10a, and the hose 1 is inserted through the spread circular portion and the lugs 10b and 10c are released at the desired mounting position. Thus, the fastening band 9 imparts a suitable compressive force to the hose 1 by the contractive resiliency of the circular portion 10a, by which compressive force the axial movement of the one-way valve unit V may be avoided.

While in the illustrated embodiment, the fastening band 9 is mounted at the position A on the side of the booster shell S and in the proximity of the one-way valve unit V in order to prevent possible attraction of the one-way valve unit V towards the booster shell due to vacuum stored within the booster shell S when vacuum within the intake manifold M is rapidly decreased such as in rapid acceleration or stoppage of the engine, it should be understood that the fastening band may be also mounted at the same position B as that of the housing 2 of the one-way valve unit V. Further, where the one-way valve unit V is possibly moved towards the intake manifold M, the fastening band may be mounted at the position C on the side of the intake manifold M and in the proximity of the one-way valve unit V or at both positions A and B if necessary.

The outer surface of the fastening band 9 is applied with a mark 12 which indicates the mounting direction of the hose 1, and such a mark 12 includes in the illustrated embodiment, the word "ENGINE" and the narrow surrounding said letter to indicate the direction for opening the valve member 6, that is, the direction of the connection end of the hose 1 on the side of the internal combustion engine. Accordingly, when the hose 1 is connected to the intake manifold M and booster shell S, the operator will not take a wrong setting direction of the one-way valve unit V even if the one-way valve unit V is invisible from the outside of the hose 1 as far as he selects the direction of the hose 1 so that the arrow direction of "ENGINE" is directed towards the intake manifold M.

In accordance with the present invention, as described above, the single flexible hose to provide a connection between the booster shell and the intake manifold internally and closely receives the housing of the one-way valve unit without cutting the hose in the midst thereof, and therefore even if the hose is bended in any way, there is no possible leakage of vacuum from the seamless flow passage to increase the reliability materially. In addition, the position of the one-way valve unit in the flow passage may be freely selected merely by changing the fitting position between the housing and the hose. Thus, the hose of the invention may be applied to various servomotors and can be produced in volume. Furthermore, the hose of the invention is simple in construction and the products may be presented at low cost.

In addition, the valve member and the valve spring are accommodated within the housing internally provided with the valve seat portion, the cylindrical guide portion and the annular seal projection of a larger diameter, and in the state where the one-way valve unit is mounted, the guide portion is fitted in the internal surface of the hose and the seal projection is urged thereinto. With this, the one-way valve unit may be properly controlled in attitude at all times and forced into the hose readily and the sealing function of the seal projection may be stabilized. Accordingly, there occurs no short-circuit flow outside the housing to increase the reliability materially.

Moreover, the fastening band is provided in the outer periphery of the hose to prevent movement of the one-way valve unit disposed interiorly thereof, and the band is applied with a mark which indicates the mounting direction of the hose, and accordingly, a single member may perform two modes of function, one for a stop for movement of said one-way valve and the other for a display plate indicating the mounting direction of the hose. With this, it is possible, by the provision of a simple construction, to positively prevent movement of the one-way valve unit due to pressure within the hose and to prevent a wrong connection of the hose.

While a few presently preferred embodiments of the invention are shown and described, it will be apparent to those skilled in the art that various changes and modifications may be made therein without departing from the spirit of the invention or from the scope of the appended claims.

What is claimed is:

1. In a connection device for use with a vacuum operated servomotor comprising a flexible hose connected between a booster shell of said servomotor and an intake manifold of an internal combustion engine; a housing having a valve seat, a cylindrical guide portion, and an annular seal projection of a diameter larger than that of said cylindrical guide portion all disposed in an axial direction; a valve member disposed in said housing; and a valve spring in said housing for urging said valve member into seating engagement with said valve seat, said housing being urged into said hose and said cylindrical guide portion being closely fitted in the inner surface of said hose while said seal projection acts to expand said hose radially outwardly to form a tight seal therebetween; the improvement comprises said seal projection having a caulked portion formed at one end of said housing for holding therein an outer peripheral portion of a retainer for supporting a fixed end of said valve spring.

* * * * *